United States Patent
Takahashi et al.

(10) Patent No.: US 11,210,574 B2
(45) Date of Patent: Dec. 28, 2021

(54) PRINTING APPARATUS AND PRINTING METHOD

(71) Applicant: SCREEN Holdings Co., Ltd., Kyoto (JP)

(72) Inventors: Susumu Takahashi, Kyoto (JP); Hiroyuki Kataoka, Kyoto (JP); Satoshi Yasuda, Kyoto (JP); Tetsuya Ishida, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 32 days.

(21) Appl. No.: 17/049,706

(22) PCT Filed: Nov. 5, 2018

(86) PCT No.: PCT/JP2018/040956
§ 371 (c)(1),
(2) Date: Oct. 22, 2020

(87) PCT Pub. No.: WO2019/098065
PCT Pub. Date: May 23, 2019

(65) Prior Publication Data
US 2021/0241053 A1    Aug. 5, 2021

(30) Foreign Application Priority Data
Nov. 17, 2017   (JP) .............................. JP2017-221668

(51) Int. Cl.
*G06K 15/00* (2006.01)
*G06K 15/02* (2006.01)
*G06K 15/16* (2006.01)

(52) U.S. Cl.
CPC ........... *G06K 15/022* (2013.01); *G06K 15/16* (2013.01)

(58) Field of Classification Search
CPC ......... G06K 15/022; G06K 15/16; B41J 2/01; B41J 2/165; B41J 3/54; B41J 3/60; B41J 11/46; B41J 21/16; B41J 25/20
See application file for complete search history.

(56) References Cited

U.S. PATENT DOCUMENTS

| 2009/0293750 | A1* | 12/2009 | Haenni | ...................... B41J 3/60 101/484 |
| 2010/0296117 | A1* | 11/2010 | Dobbertin | .............. G03G 15/60 358/1.15 |
| 2015/0183214 | A1* | 7/2015 | Yasuzaki | ................ B41J 2/2142 347/9 |

FOREIGN PATENT DOCUMENTS

| JP | 2003039630 A | * | 2/2003 |
| JP | 2005-153208 A | | 6/2005 |

(Continued)

OTHER PUBLICATIONS

International Search Report dated Jan. 15, 2019 in corresponding PCT International Application No. PCT/JP2018/040956.

(Continued)

*Primary Examiner* — Huo Long Chen
(74) *Attorney, Agent, or Firm* — Ostrolenk Faber LLP

(57) ABSTRACT

A printing apparatus includes: a mechanism transporting a print medium; a first sensor outputting a signal indicating the presence or absence of a first mark; a first determining unit determining, on a first surface, a position of a second mark and a print position of an image based on the output signal; a first print head printing the second mark and the image at the determined print positions; a second sensor outputting a signal indicating the presence or absence of the first and second marks; a second determining unit locating a position of a predetermined one of the first and second marks, based on the signal output from the second sensor, and determines, on a second surface of the print medium, a print position of (Continued)

a target image based on the located position of the predetermined mark; and a second print head printing the target image at the determined print position.

10 Claims, 15 Drawing Sheets

(56) References Cited

FOREIGN PATENT DOCUMENTS

| JP | 2012-527640 A | 11/2012 |
|----|---------------|---------|
| JP | 2015-123665 A | 7/2015  |
| JP | 2016-117246 A | 6/2016  |
| JP | 2016-153234 A | 8/2016  |

OTHER PUBLICATIONS

Written Opinion dated Jan. 15, 2019 in corresponding PCT International Application No. PCT/JP2018/040956.
International Preliminary Report on Patentability dated May 19, 2020 in corresponding PCT International Application No. PCT/JP2018/040956.

* cited by examiner

F I G. 1 5

| ROLES OF MARKS | FIRST PRINTING METHOD (FIGS. 2 AND 4) | SECOND PRINTING METHOD (FIGS. 3 AND 5) |
|---|---|---|
| (1) INDICATING WHETHER IMAGE G2 NEEDS TO BE PRINTED | M1 | M1 |
| (2) INDICATING PRINT CRITERION OF IMAGE G2 | M1 | M1 |
| (3) INDICATING PRINT CRITERION OF MARK M2 | M1 | M1 |
| (4) INDICATING WHETHER IMAGE G3 NEEDS TO BE PRINTED | M1, M2 | M1, M2 |
| (5) INDICATING PRINT CRITERION OF IMAGE G3 | M1 | M2 |

PRINTING APPARATUS AND PRINTING METHOD

CROSS-REFERENCE TO RELATED APPLICATIONS

The present application is a 35 U.S.C. §§ 371 national phase conversion of International Application No. PCT/JP2018/040956, filed Nov. 5, 2018, which claims priority to Japanese Patent Application No. 2017-221668, filed Nov. 17, 2017, the contents of both of which are incorporated herein by reference. The PCT International Application was published in the Japanese language.

TECHNICAL FIELD

The present disclosure relates to a printing technology for overprinting sheets of a printed medium.

BACKGROUND ART

Conventionally, variable data has been printed by overprinting printing paper on which an image of a regular format is already printed, for example, in printing of a business form or a bill. This printing is referred to as variable printing.

Patent Document 1 discloses a line-based inkjet recording apparatus that overprints a recording medium on which a preceding printing apparatus has printed. This apparatus includes a position detection sensor that detects a position of a mark pre-printed on printing paper (a pre-printed mark), and a speed detection sensor that detects a transport speed of the printing paper. This apparatus performs the overprinting by controlling an activation start timing of a recording head based on the position of the mark detected by the position detection sensor and the transport speed detected by the speed detection sensor.

PRIOR ART DOCUMENT

Patent Document

[Patent Document 1] Japanese Patent Application Laid-Open No. 2005-153208

SUMMARY

Problem to be Solved by the Invention

FIG. 14 illustrates operations of detecting pre-printed marks M100 by a conventional printing apparatus to perform overprinting. Each of continuous papers WP100 and WP101 is divided into a plurality of sheets (pages), and one pre-printed mark M100 is pre-printed on each of the sheets. In the continuous paper WP100, the pre-printed mark M100 is placed slightly behind a leading end of each sheet in a transport direction Y1. In the continuous paper WP101, the pre-printed mark M100 is placed at the leading end of each sheet.

This printing apparatus obtains, from a sensor facing a movement path for the pre-printed mark M100, a signal SG100 indicating the presence or absence of the pre-printed mark M100 facing this sensor to locate the position of the pre-printed mark M100, and prints an image with respect to the position of the pre-printed mark M100. Here, the printing apparatus prints, on the sheet, a printing start mark (a cue mark) M200 indicating start of printing the image.

The printing apparatus prints the printing start mark M200 at the leading end of the sheet in the continuous paper WP100, and prints the printing start mark M200 behind the pre-printed mark M100 in the transport direction Y1 in the continuous paper WP101. As a result of this, the order of the pre-printed mark M100 and the printing start mark M200 are reversed between the continuous papers WP100 and WP101.

When overprinting, with an image for the back surface, the back surface of a sheet on which the pre-printed mark M100 and the printing start mark M200 are printed, the printing apparatus overprints the back surface with the image with respect to the position of the latter mark in the transport direction Y1 out of the two marks, irrespective of the order of the pre-printed mark M100 and the printing start mark M200.

In other words, the printing apparatus prints with respect to the position of the pre-printed mark M100 in the continuous paper WP100, and prints with respect to the printing start mark M200 in the continuous paper WP101. In addition to a position error in printing the printing start mark M200, printing with respect to the printing start mark M200 further causes an error. Thus, the printing apparatus has a problem with different accuracy of printing on the back surface with respect to the front surface, between when printing on the back surface of the continuous paper WP100 and when printing on the back surface of the continuous paper WP101.

The present disclosure has been conceived to solve the problem, and has an object of providing a technology for reducing variations in the accuracy of printing on the back surface with respect to the front surface, irrespective of positions of pre-printed marks.

Means to Solve the Problem

To solve the problem, a printing apparatus according to a first aspect includes: a transport mechanism that transports, along a transport path, sheets of a print medium with a first surface on which a first mark is pre-printed; a first sensor disposed to face the transport path, the first sensor outputting a signal indicating the presence or absence of the first mark facing the first sensor, in a process of transporting the print medium by the transport mechanism; a first determining unit that locates a position of the first mark based on the signal output from the first sensor, and determines, on the first surface, a print position of a second mark and a print position of a first target image based on the located position of the first mark; a first print head disposed more downstream of the transport path than the first sensor to face the first surface, the first print head printing the second mark at the print position of the second mark and the first target image at the print position of the first target image, the print positions being determined on the first surface by the first determining unit; a second sensor disposed more downstream of the transport path than the first print head to face the first surface, the second sensor outputting a signal indicating the presence or absence of the first mark facing the second sensor and the presence or absence of the second mark facing the second sensor, in the process of transporting the print medium by the transport mechanism; a second determining unit that locates a position of a predetermined one of the first mark and the second mark, based on the signal output from the second sensor, and determines, on a second surface of the print medium, a print position of a second target image based on the located position of the predetermined one of the first mark and the second mark; and a second print head disposed more downstream of the transport path than the second sensor to face the second surface, the second print head printing the second target image at the print position of the second target image, the print position being determined on the second surface by the second determining unit.

A printing apparatus according to a second aspect is the printing apparatus according to the first aspect, and a pre-print image is pre-printed on the first surface, and the first mark is the predetermined one of the first mark and the second mark.

A printing apparatus according to a third aspect is the printing apparatus according to the first aspect, and the second mark is the predetermined one of the first mark and the second mark.

A printing apparatus according to a fourth aspect is the printing apparatus according to the first aspect, and a pre-print image is pre-printed on the first surface, the printing apparatus further includes a designating unit that designates one of the first mark and the second mark as the predetermined mark, and the second determining unit determines, on the second surface of the print medium, the print position of the second target image based on a position of the mark designated by the designating unit.

A printing apparatus according to a fifth aspect is the printing apparatus according to the first aspect, the print medium is long lengths of a continuous sheet, and a plurality of the first marks are pre-printed on the first surface along a longitudinal direction of the print medium, the printing apparatus prints sheet by sheet on at least one predetermined target sheet among a plurality of sheets predefined in the print medium to correspond to the plurality of the first marks, the first sensor outputs the signal indicating the presence or absence of the first mark facing the first sensor among the plurality of the first marks, in the process of transporting the print medium by the transport mechanism, the first determining unit locates a position of the first mark in each of the at least one predetermined target sheet, based on the signal output from the first sensor, and determines, on the first surface of the target sheet, the print position of the second mark and the print position of the first target image based on the located position of the first mark, the first print head prints the second mark at each of the print positions of the second mark and the first target image at each of the print positions of the first target image, the print positions being determined on the first surface of the print medium by the first determining unit, the second sensor outputs a signal indicating the presence or absence of the first mark facing the second sensor among the plurality of the first marks and the presence or absence of the second mark facing the second sensor among the second marks printed by the first print head, in the process of transporting the print medium by the transport mechanism, the second determining unit determines, in each of the plurality of sheets based on the signal output from the second sensor, whether both of the first mark and the second mark are printed on the sheet, locates the position of the predetermined one of the first mark and the second mark when both of the first mark and the second mark are printed on the sheet, and determines, on the second surface of the sheet, the print position of the second target image based on the located position of the predetermined one of the first mark and the second mark, and the second print head prints the second target image at each of the print positions of the second target image, the print positions being determined on the second surface of the print medium by the second determining unit.

A printing apparatus according to a sixth aspect is the printing apparatus according to the fifth aspect, the first determining unit determines the print position of the second mark in each of the at least one predetermined target sheet so that the first mark and the second mark are aligned in a predetermined order along the transport path, the second determining unit determines, in each of the plurality of sheets based on waveform signals representing signal values of signals output from the second sensor which correspond to positions of the sheet along the transport path, that both of the first mark and the second mark are printed on the sheet, when a continued length of a signal value corresponding to a front mark aligned in the order is greater than a first threshold and a continued length of a signal value corresponding to a rear mark aligned in the order is greater than a second threshold, and the first threshold is smaller than the length of the front mark in the transport path, and the second threshold is smaller than the length of the rear mark in the transport path.

A printing apparatus according to a seventh aspect is the printing apparatus according to the sixth aspect, the first print head ejects printing liquid toward a trailing end of the first surface of a non-target sheet on which a target image is not printed among the plurality of sheets to perform flushing, so that a linear flushing pattern that extends in a width direction of the print medium is printed at the trailing end of the first surface of the non-target sheet, the non-target sheet is joined to the target sheet on which the first print head prints the target image, ahead of the target sheet in the transport path, and the first print head prints the flushing pattern, the front mark, and the rear mark in the transport path so that the flushing pattern is shorter than the front mark, the printing apparatus further includes a threshold setting unit that sets the first threshold larger than a length of the flushing pattern in the transport path and smaller than the length of the front mark in the transport path.

A printing apparatus according to an eighth aspect is the printing apparatus according to the sixth aspect, the first print head ejects printing liquid toward a trailing end of the first surface of a non-target sheet on which a target image is not printed among the plurality of sheets to perform flushing, so that a linear flushing pattern that extends in a width direction of the print medium is printed at the trailing end of the first surface of the non-target sheet, the non-target sheet is joined to the target sheet on which the first print head prints the target image, ahead of the target sheet in the transport path, and the first print head prints the flushing pattern, the front mark, and the rear mark in the transport path so that the flushing pattern is longer than the front mark, the front mark is shorter than the rear mark, and the flushing pattern is joined to the front mark, the printing apparatus further includes a threshold setting unit that sets the first threshold smaller than the length of the front mark in the transport path, and sets the second threshold larger than the length of the front mark and smaller than the length of the rear mark in the transport path.

A method according to an ninth aspect is a method for printing on sheets of a print medium with a first surface on which a first mark is pre-printed, the method includes: a first determining step of determining, on the first surface, a print position of a second mark and a print position of a first target image based on a position of the first mark; a first printing step of printing the second mark at the print position of the second mark and the first target image at the print position of the first target image, the print positions being determined on the first surface in the first determining step; a second determining step of determining, on a second surface of the print medium, a print position of a second target image based on a position of a predetermined one of the first mark and the second mark; and a second printing step of printing the second target image at the print position of the second target image, the print position being determined on the second surface in the second determining step.

A method according to a tenth aspect is the method according to the ninth aspect, the print medium is long lengths of a continuous sheet, and a plurality of the first marks are pre-printed on the first surface along a longitudinal direction of the print medium, the printing method is a method for printing sheet by sheet on at least one predetermined target sheet among a plurality of sheets predefined in the print medium to correspond to a plurality of the first marks, the first determining step is a step of determining, on the first surface of each of the at least one predetermined target sheet, the print position of the second mark and the print position of the first target image based on the position of the first mark in the target sheet, the first printing step is a step of printing the second mark at each of the print positions of the second mark and the first target image at each of the print positions of the first target image, the print positions being determined on the first surface of the print medium in the first determining step, the second determining step is a step of determining whether both of the first mark and the second mark are printed on each of the plurality of sheets, and determining, on the second surface of the sheet, the print position of the second target image based on the position of the predetermined one of the first mark and the second mark when both of the first mark and the second mark are printed on the sheet, and the second printing step is a step of printing the second target image at each of the print positions of the second target image, the print positions being determined on the second surface of the print medium in the second determining step.

Effects of the Invention

According to the first aspect of the present disclosure, the printing apparatus prints the first target image at the print position determined on the first surface of the print medium based on the position of the first mark, and prints the second target image at the print position determined on the second surface based on the position of the predetermined one of the first mark and the second mark. Since the printing apparatus can print the target image on the second surface with respect to the position of the same one of the first mark and the second mark, irrespective of the position of the first mark, variations in the accuracy of printing on the second surface (back surface) with respect to the first surface (front surface) can be reduced.

According to the second aspect of the present disclosure, the printing apparatus prints the first target image and the second mark at the print positions determined on the first surface of the print medium based on the position of the first mark. Furthermore, the printing apparatus prints the second target image at the print position determined on the second surface of the print medium based on the position of the first mark. As a result of this, variations in the position relationship between the first image and the pre-print image pre-printed on the first surface and the position relationship between the pre-print image and the second image can be reduced.

According to the third aspect of the present disclosure, the printing apparatus prints the second mark and the first image on the first surface of the print medium with respect to the same first mark. Thus, the position accuracy of the second mark and the first image is maintained. Furthermore, the printing apparatus prints the second image on the second surface of the print medium with respect to the second mark. Thus, the position accuracy of the second mark and the second image is maintained. As a result of this, variations in the position relationship between the first image and the second image can be reduced.

According to the fourth aspect of the present disclosure, the printing apparatus includes a designating unit that designates one of the first mark and the second mark as the predetermined mark, and the second determining unit determines, on the second surface of the print medium, the print position of the second target image based on a position of the mark designated by the designating unit. When the designating unit designates the first mark, variations in the position relationship between the first image and the pre-print image pre-printed on the first surface and the position relationship between the pre-print image and the second image can be reduced. When the designating unit designates the second mark, variations in the position relationship between the first image and the second image can be reduced. As such, a printing method can be selected.

According to the fifth aspect of the present disclosure, the printing apparatus prints the second target image at the print position determined on the second surface of each sheet on which both of the first mark and the second mark are printed among a plurality of sheets defined in the print medium. Thus, even when printing on the first surface of only a part of the plurality of sheets defined in the print medium, the printing apparatus can extract the target sheets, and print an image on the second surface.

According to the sixth aspect of the present disclosure, whether both of the first mark and the second mark are printed on a sheet can be easily determined, using the first and second thresholds.

According to the seventh aspect of the present disclosure, the printing apparatus can detect the front mark and the rear mark printed on one sheet, when the first print head prints the flushing pattern and the flushing pattern is shorter than the front mark out of the first mark and the second mark in the transport path.

According to the eighth aspect of the present disclosure, the printing apparatus can detect the front mark and the rear mark printed on one sheet, when the first print head prints the flushing pattern longer than the front mark and the flushing pattern is joined to the front mark.

According to the ninth aspect of the present disclosure, the printing apparatus prints the target image at the print position determined on the first surface of the print medium based on the position of the first mark, and prints the target image at the print position determined on the second surface based on the position of the predetermined one of the first mark and the second mark. Since the printing apparatus can print the target image on the second surface with respect to the position of the same one of the first mark and the second mark, irrespective of the position of the first mark, variations in the accuracy of printing on the second surface (back surface) with respect to the first surface (front surface) can be reduced.

According to the tenth aspect of the present disclosure, the printing apparatus prints the target image at the print position determined on the second surface of each sheet on which both of the first mark and the second mark are printed among a plurality of sheets defined in the print medium. Thus, even when printing on the first surface of only a part of the plurality of sheets defined in the print medium, the printing apparatus can extract the target sheets, and print an image on the second surface.

BRIEF DESCRIPTION OF DRAWINGS

FIG. 15 is a table in which roles of marks to be used in the embodiment are arranged.

DESCRIPTION OF EMBODIMENTS

An embodiment of the present disclosure will be hereinafter described with reference to the drawings.

[1. Configuration of Printing Apparatus 100]

Figure 1:
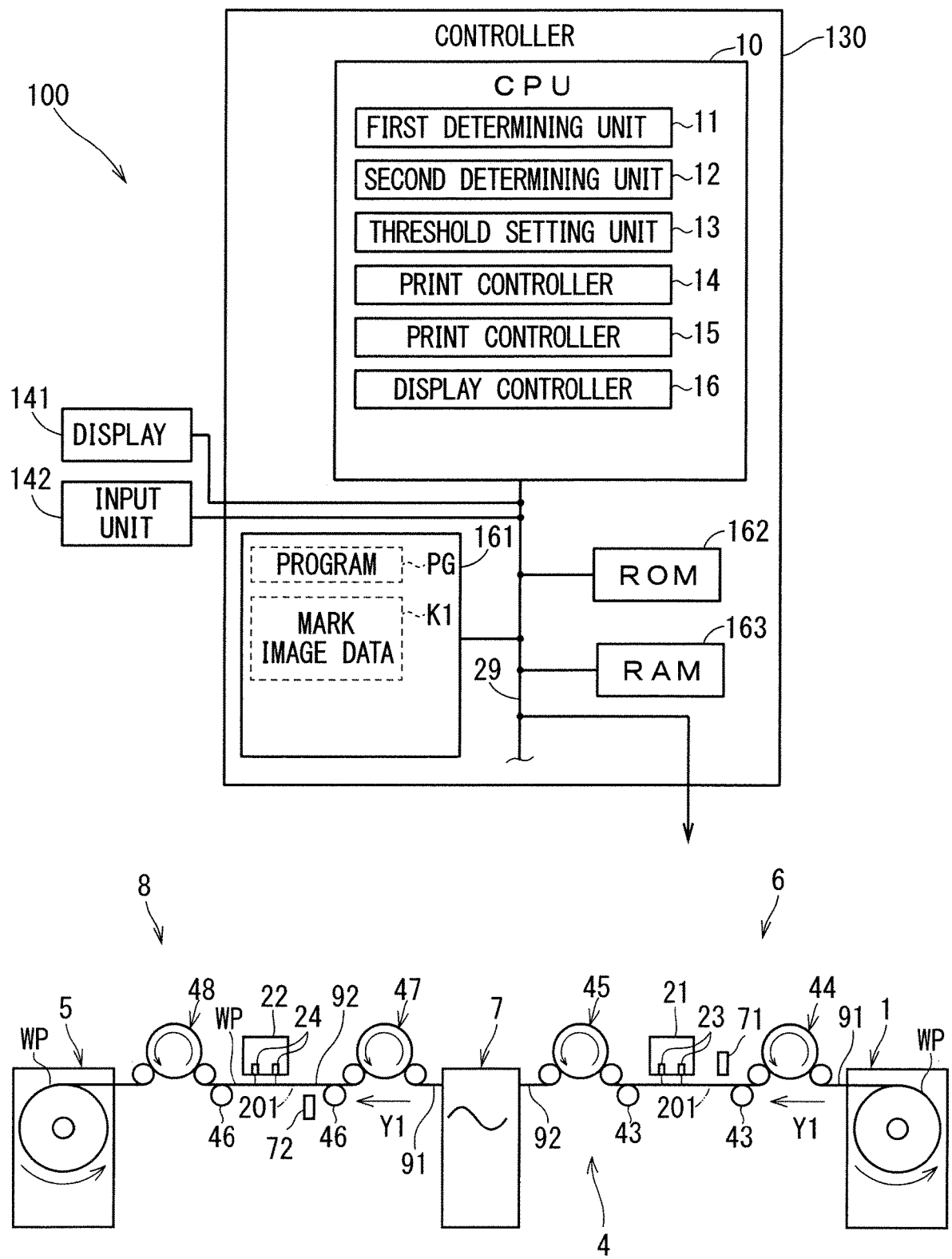
FIG. 1 is a schematic diagram illustrating an example overall configuration of a printing apparatus according to an embodiment.

FIG. 1 is a schematic diagram illustrating an example overall configuration of a printing apparatus 100 according to the embodiment.

The printing apparatus 100 according to the embodiment includes a paper feeder 1, a front surface printing unit 6, an inversion unit 7, a back surface printing unit 8, a paper ejector 5, and a controller 130.

The paper feeder 1 supplies a roll of continuous paper WP. In the following description, an external surface of the continuous paper WP held in rolled form by the paper feeder 1 will be referred to as a first surface or a "front surface 91" as necessary, and an inner surface thereof will be referred to as a second surface or a "back surface 92" as necessary. The front surface printing unit 6 is, for example, inkjet-based, and prints on the front surface 91 of the continuous paper WP. The inversion unit 7 includes a plurality of rollers, and inverts the front surface 91 of the continuous paper WP into the back surface. The back surface printing unit 8 is, for example, inkjet-based, and prints on the back surface 92 of the continuous paper WP. The paper ejector 5 winds, in rolled form, the continuous paper WP with printed front and back surfaces so that the second surface (back surface) faces outward. After the printing apparatus 100 finishes printing, the continuous paper WP wound by the paper ejector 5 is unwound toward a cutter that is not illustrated, and is cut into a plurality of sheets of a fixed length. The length of each sheet is defined by a job. The continuous paper WP is, for example, cut with respect to marks printed on the continuous paper WP. The marks are referred to as cut marks. When printing various images, the printing apparatus 100 prints the cut marks along boundaries between adjacent sheets.

The continuous paper WP is a "print medium" according to the present disclosure. The continuous paper WP consists of sheets of a print medium with the front surface 91 on which first marks M1 are pre-printed. Specifically, the continuous paper WP is long lengths of a continuous sheet, and a plurality of the first marks M1 are pre-printed on the front surface 91 along the longitudinal direction.

The printing apparatus 100 prints sheet by sheet on at least one predetermined target sheet among a plurality of sheets predefined in the continuous paper WP to correspond to the plurality of the first marks M1. Printing a target image within a target sheet without extending off the next sheet suffices to print sheet by sheet.

The paper feeder 1 rotatably holds the continuous paper WP around the horizontal axis, and unwinds the continuous paper WP to supply it to the front surface printing unit 6. The paper ejector 5 winds, around the horizontal axis, the continuous paper WP with the printed front and back surfaces.

The front surface printing unit (a first printing unit) 6 includes upstream a drive roller 44 for loading the continuous paper WP from the paper feeder 1. The continuous paper WP unwound by the drive roller 44 from the paper feeder 1 is transported downstream along a plurality of transport rollers 43. The transport rollers 43 and transport rollers 46 of the back surface printing unit 8 to be described later comprise a transport mechanism 4. The transport mechanism 4 transports the continuous paper WP along a transport path 201.

The front surface printing unit 6 includes the most downstream a drive roller 45. The front surface printing unit 6 includes, between the drive rollers 44 and 45, a sensor 71, a print head (first print head) 21 that prints on the continuous paper WP with the front surface 91 facing upward, and a drier that is not illustrated in the order from the upstream end. The drier dries the ink ejected from the first print head 21.

The sensor 71 is located above the continuous paper WP to face the front surface (first surface) 91 of the continuous paper WP, that is, the transport path 201. Specifically, the sensor 71 faces a movement path for the first marks M1 on the front surface 91 of the continuous paper WP.

The sensor 71 outputs a signal SG1 (see FIGS. 2A to 2D, etc.,) indicating the presence or absence of the first mark M1 facing this sensor, in a process of transporting the continuous paper WP by the transport mechanism 4. Specifically, the sensor 71 outputs the signal SG1 indicating the presence or absence of the first mark M1 facing the sensor 71 among the plurality of first marks M1, in the process of transporting the continuous paper WP by the transport mechanism 4.

The inversion unit 7 horizontally inverts the continuous paper WP sent from the drive roller 45 of the front surface printing unit 6. The inversion unit 7 further sends the inverted continuous paper WP toward the back surface printing unit 8.

The back surface printing unit (a second printing unit) 8 includes upstream a drive roller 47 for loading the continuous paper WP from the inversion unit 7. The continuous paper WP loaded by the drive roller 47 is transported downstream along a plurality of the transport rollers 46. The back surface printing unit 8 includes the most downstream a drive roller 48. The back surface printing unit 8 includes, between the drive rollers 47 and 48, a sensor 72, a print head (second print head) 22 that prints on the continuous paper WP with the back surface 92 facing upward, and a drier that is not illustrated in this order. The drier dries the ink ejected from the second print head 22. The sensor 72 is located below the continuous paper WP inverted by the inversion unit 7, and faces the front surface (first surface) 91 of the continuous paper WP. Specifically, the sensor 72 faces a movement path for the first mark M1 and a second mark M2 on the front surface 91 of the continuous paper WP.

The first print head 21 (22) includes a plurality of nozzles 23 (24) that eject droplets of ink (printing liquid). The plurality of nozzles 23 (24) are arranged in a direction crossing the longitudinal direction of the continuous paper WP to form nozzle arrays. The first print head 21 (22) generally includes nozzle arrays that eject inks of a plurality of colors along the transport direction Y1 of the continuous paper WP. The first print head 21 (22) includes, for example, a plurality of nozzle arrays that eject black (K), cyan (C), magenta (M), and yellow (Y) inks. FIG. 1 illustrates only a nozzle array 23 (24) that ejects a single color (e.g., black (K)) ink in the first print head 21 (22) to facilitate the understanding of the disclosure. Thus, the flowing description is based on this. The first print head 21 (22) prints a cut mark at the trailing end of each page in the continuous paper WP, and ejects ink from a plurality of nozzles 23 (24) to perform flushing. The first print head 21 (22) performs the flushing to form, on a page, a linear flushing pattern FL1 that extends in a width direction of the continuous sheet.

The first print head 21 (22) is disposed in a position so that the longitudinal direction of the first print head 21 (22) is oriented toward a direction orthogonal to the transport direction Y1 of the continuous paper WP. The first print head 21 (22) is disposed to face the transport path of the continuous paper WP using the transport mechanism 4. The first print head 21 (22) is preferably longer than or equal to the width of the continuous paper WP. The transport direction Y1 of the continuous paper WP is opposite to a print direction Y3. In other words, the upstream side in the transport direction Y1 is the downstream side in the print direction Y3, whereas the downstream side in the transport direction Y1 is the upstream side in the print direction Y3.

The first print head 21 is disposed more downstream of the transport path 201 than the sensor 71 to face the front surface 91. The first print head 21 prints the second mark M2 at a print position of the second mark M2 and also prints a target image at a print position of the target image. The print positions are determined on the front surface 91 by a first determining unit 11.

Specifically, in the process of transporting the continuous paper WP by the transport mechanism 4, the first print head 21 prints the second mark M2 at each print position of the second mark M2 and also prints the target image at each print position of the target image. The print positions are determined on the front surface 91 of the continuous paper WP by the first determining unit 11.

An upper portion of each of sheets (pages) defined in the continuous paper WP is set downstream in the transport direction Y1 (the upstream side in the print direction Y3), whereas a lower portion of each of the pages is set upstream of the transport path 201 (the downstream side in the print direction Y3). The first print head 21 prints so that the top and the bottom of an image printed on each page coincide with the top and the bottom of the page, respectively.

The sensor 72 is disposed more downstream of the transport path 201 than the first print head 21 to face the front surface 91. The sensor 72 outputs a signal SG2 (see FIGS. 2A to 2D, etc.,) indicating the presence or absence of the first mark M1 and the presence or absence of the second mark M2 that face this sensor, in the process of transporting the continuous paper WP by the transport mechanism 4.

Specifically, the sensor 72 outputs the signal SG2 indicating the presence or absence of the first mark M1 facing the sensor 72 among the plurality of first marks M1 and the presence or absence of the second mark M2 facing the sensor 72 among a plurality of the second marks M2 printed by the first print head 21, in the process of transporting the continuous paper WP by the transport mechanism 4. The signal SG2 output from the sensor 72 is supplied to the controller 130.

Each of the sensors 71 and 72 is, for example, a reflective photosensor, and outputs an electrical signal corresponding to a magnitude of the intensity of light reflected from the continuous paper WP. Each of the sensors 71 and 72 binarizes the electrical signal into a binary using a predetermined threshold. The sensor 71 emits light toward the movement path for the plurality of first marks M1, whereas the sensor 72 emits light toward the movement path for the plurality of first marks M1 and the plurality of second marks M2.

The controller 130 is electrically connected to each of the paper feeder 1, the front surface printing unit 6, the inversion unit 7, the back surface printing unit 8, and the paper ejector 5 of the printing apparatus 100, and controls operations of these. A configuration of a general computer is applicable to the configuration of the controller 130 as hardware. Specifically, the controller 130 includes through an electrical connection to a bus line 29, for example, a CPU 10 that performs various computation processes, a ROM 162 that is read-only memory for storing a basic program, a RAM163 that is readable/writable memory for storing various pieces of information, and a magnetic disk 161 for storing a program PG or data.

A display 141 such as a liquid crystal panel and an input unit (receiving unit) 142 such as a keyboard are also electrically connected to the bus line 29. The input unit 142 also includes an interface that enters, into the controller 130, a signal supplied from, for example, an external host computer. The controller 130 also includes an output interface (not illustrated) that outputs a signal to, for example, the external host computer. For example, mark image data K1 indicating the plurality of second marks M2 and the flushing pattern FL1 is stored in the magnetic disk 161.

Various pieces of information entered by an operator through operating the input unit 142 are also stored in the magnetic disk 161. Examples of the information include a specification of the continuous paper WP (e.g., a width, a thickness, and a length of paper) and image data to be printed. The operator gives, through the input unit 142, the controller 130 information including whether the continuous paper WP set in the printing apparatus 100 includes the first mark M1, and the position of the first mark M1 from the leading end of each sheet (each page) and the size of the first mark M1 in the presence of the first mark M1. The controller 130 also stores the information in the magnetic disk 161. The image data is supplied, for example, from the external host computer to the controller 130 through the input unit 142.

The input unit 142 receives a designation of one portion out of a leading end and a trailing end of a page as a target portion at which the cut mark is to be printed. One of the print heads 21 and 22 prints the cut marks on the continuous paper WP. When the input unit 142 receives a designation of the leading end of each page as the target portion, the first print head 21 (22) prints the cut mark at the leading end of the page. When the input unit 142 receives a designation of the trailing end of each page as the target portion, the first print head 21 (22) prints the cut mark at the trailing end of the page.

In the controller 130, the CPU 10 performs, as a main controller, computation processes in the procedure written in the program PG to implement various functional units that control the units of the printing apparatus 100. Specifically, the CPU 10 operates as the functional units including the first determining unit 11, a second determining unit 12, a threshold setting unit 13, a print controller 14 (15) that controls operations of the front surface printing unit 6 (the back surface printing unit 8), and a display controller 16 that controls display operations of the display 141.

The first determining unit 11 locates the position of the first mark M1 based on the signal SG1 output from the sensor 71, and determines, on the front surface 91, a print position of the second mark M2 and a print position of a target image based on the located position of the first mark M1.

Specifically, the first determining unit 11 locates the position of the first mark M1 in at least one target sheet (target page) among a plurality of sheets (pages) defined in the continuous paper WP, based on the signal SG1 output from the sensor 71. The first determining unit 11 further determines, on the front surface 91 of the target sheet, a print position of the second mark M2 and a print position of a target image based on the located position of the first mark M1. The signal SG1 output from the sensor 71 is supplied to the controller 130.

Here, the first determining unit 11 determines the print position of the second mark M2 in the at least one target sheet so that the first mark M1 and the second mark M2 are aligned in a predetermined order along the transport path 201 (the details will be described later) and the first mark M1 and the second mark M2 do not overlap.

The second determining unit 12 locates a position of a predetermined one of the first mark M1 and the second mark M2, based on the signal SG2 output from the sensor 72, and determines, on the back surface 92 of the continuous paper WP, a print position of a target image based on the located position of one of the marks.

Specifically, the second determining unit 12 determines whether both of the first mark M1 and the second mark M2 are printed on each of the sheets, based on the signal SG2 output from the sensor 72. When both of the marks are printed on each of the sheets as a result of the determination, the second determining unit 12 locates the position of the predetermined one of the marks, and determines, on the back surface 92 of the sheet, the print position of the target image based on the located position of one of the marks.

The second print head 22 is disposed more downstream of the transport path 201 than the sensor 72 to face the back surface 92. The second print head 22 prints the target image at the print position determined on the back surface 92 by the second determining unit 12.

Specifically, in the process of transporting the continuous paper WP by the transport mechanism 4, the second print head 22 prints the target image at each of the print positions of the target image determined on the back surface 92 of the continuous paper WP by the second determining unit 12.

A part of or all the functional units implemented by the controller 130 may be implemented as hardware by a dedicated logic circuit, etc.

Here, each of the marks M1 and M2 will be described with reference to FIGS. 2A to 2D and 15.

Figure 2A:
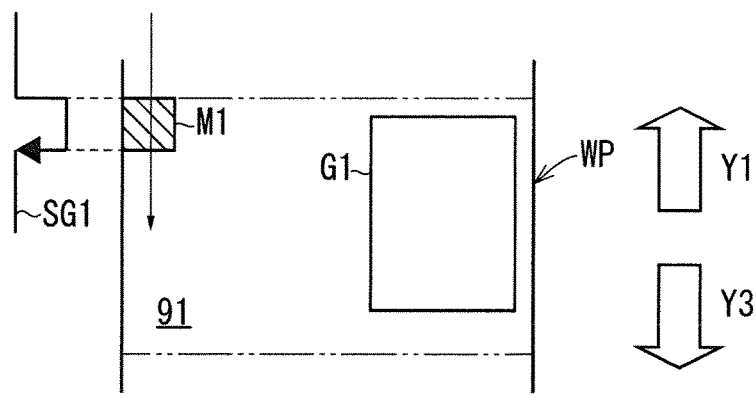
FIGS. 2A to 2D are schematic diagrams illustrating operations of the printing apparatus in FIG. 1.
Figure 2B:
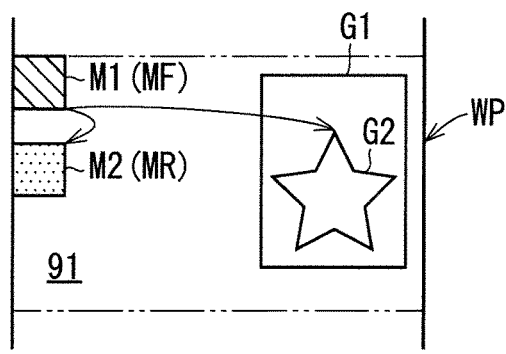
Figure 2C:
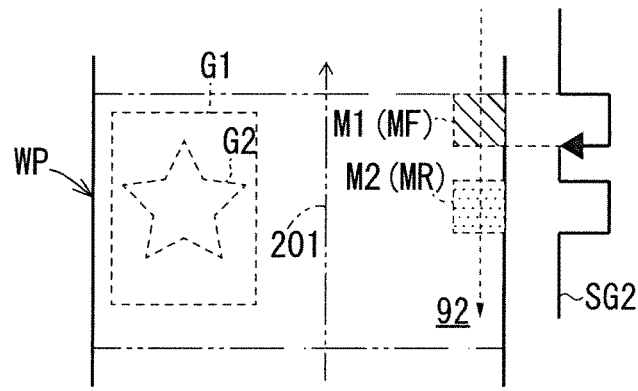
Figure 2D:
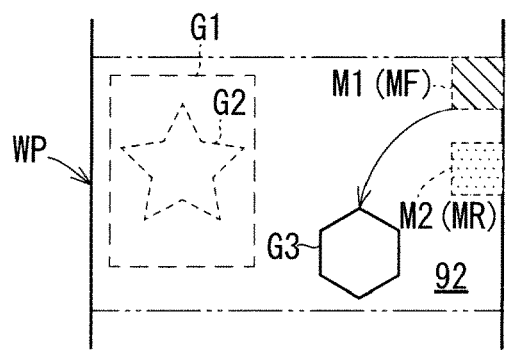

As illustrated in FIG. 2A, the first mark M1 and a pre-print image G1 are formed on the front surface 91 of the continuous paper WP (a print medium) before the printing apparatus 100 prints. From this state, the printing apparatus 100 prints the second mark M2 and a front surface overprint image (first image) G2 on the front surface 91 of the continuous paper WP as illustrated in FIG. 2B. Then, the printing apparatus 100 prints a back surface print image (second image) G3 on the back surface 92 of the continuous paper WP as illustrated in FIGS. 2C and 2D. The printing apparatus 100 allows selection of a printing method (referred to as a first printing method) that emphasizes the reproducibility of a position relationship of the front surface overprint image G2 with the pre-print image G1 and the reproducibility of a position relationship of the back surface print image G3 with the pre-print image G1 and a printing method (referred to as a second printing method) that emphasizes the reproducibility of a position relationship between the front surface overprint image G2 and the back surface print image G3.

FIG. 15 is a table in which roles of the marks M1 and M2 are arranged according to each of the first printing method and the second printing method.

As illustrated in FIG. 15, in both of the first printing method and the second printing method, the first mark M1 functions as: (1) indicating that the front surface overprint image G2 is to be printed on the front surface 91 of the target page (the controller 130 determines that the front surface overprint image G2 need not be printed on a page on which the first mark M1 is not printed); (2) indicating a criterion of a print position of the front surface overprint image G2; and (3) indicating a criterion of a print position of the second mark M2 to the controller 130. Furthermore, the first mark M1 and the second mark M2 function as: (4) indicating that the back surface print image G3 is to be printed on the back surface 92 of the target page (the controller 130 determines that the back surface print image G3 needs to be printed on a page on which both of the first mark M1 and the second mark M2 are printed). The first mark M1 functions as (5) indicating a criterion of a print position of the back surface print image G3 in the first printing method, whereas the second mark M2 functions as (5) in the second printing method.

Before starting printing, the operator designates, in advance in the controller 130 (the second determining unit 12) through the input unit 142, whether a job to be executed from now on is performed in the first printing method or the second printing method. The controller 130 registers the information in the magnetic disk 161. When the operator designates the first printing method, the second determining unit 12 determines the first mark M1 as a print reference position of the back surface print image G3. When the operator designates the second printing method, the second determining unit 12 determines the second mark M2 as the print reference position of the back surface print image G3.

Writing a printing method in advance in a job enables its designation in the controller 130 (the second determining unit 12). The job is given to the controller 130 through the input unit 142. The second determining unit 12 of the controller 130 extracts information for designating a printing method from the job, and determines one of the first mark M1 and the second mark M2 as a print reference position of the back surface print image G3.

The operator or the job may directly designate the first mark M1 or the second mark M2 as a print reference position of the back surface print image G3 through, for example, the input unit 142, instead of designating a printing method as described above.

Next, a position relationship between the first mark M1 and the second mark M2 will be described. As described above, the first marks M1 are formed in advance in the continuous paper WP. Although the first mark M1 is normally formed in proximity to the leading end of each page in the transport direction Y1, the first mark M1 may be formed more downstream than the proximity to the leading end of each page in the transport direction Y1. In the former case, the first mark M1 and the second mark M2 are printed in this order from the leading end of each page toward the downstream side. In the latter case, printing the second mark M2 and the first mark M1 in this order is preferred in view of securing a printing area in an actual image. Thus, the operator enters position information on the first mark M1 with respect to the leading end of each page through the input unit 142 in advance of starting printing a job. The controller 130 (the first determining unit 11) determines a print position of the second mark M2 as being upstream or downstream of the first mark M1, depending on whether the first mark M1 is located downstream in the transport direction Y1 at a distance of a width of the second mark M2 or larger in a paper step direction with respect to the leading end of each page. When the controller 130 determines the print position of the second mark M2 as being upstream of the first mark M1, the second mark M2 becomes a front mark MF, and the first mark M1 becomes a rear mark MR. Conversely, when the controller 130 determines the print position of the second mark M2 as being downstream of the first mark M1, the first mark M1 becomes the front mark MF, and the second mark M2 becomes the rear mark MR. As such, the order of the first mark M1 and the second mark M2 is defined. Furthermore, the second determining unit 12 identifies each of the front mark MF and the rear mark MR detected by the sensor 72 as the first mark M1 or the second mark M2, based on the determination of the first determining unit 11.

[2. Operations of Printing Apparatus 100]

Figure 12:
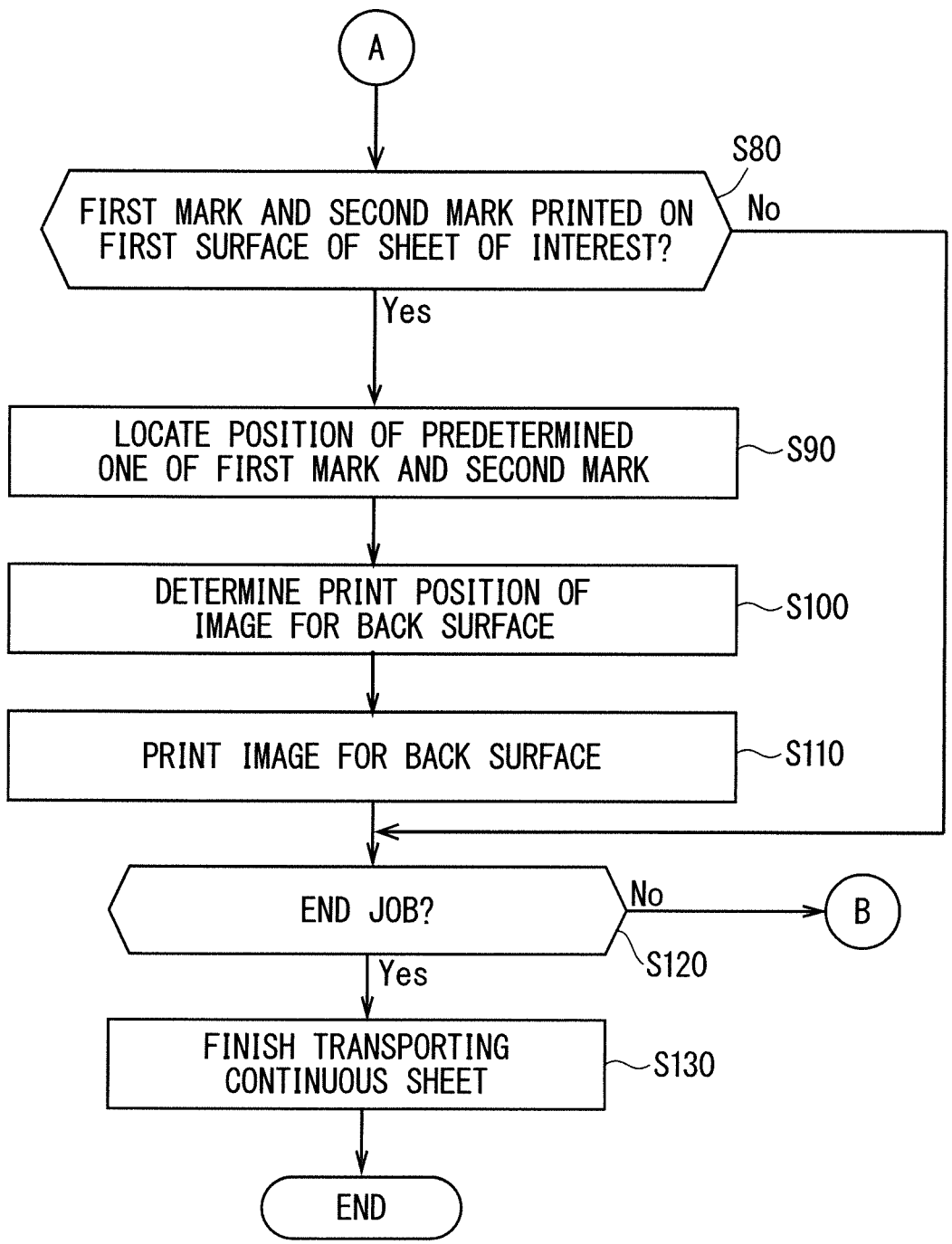
FIG. 12 is a flowchart illustrating an example of operations of the printing apparatus according to the embodiment.
Figure 13:
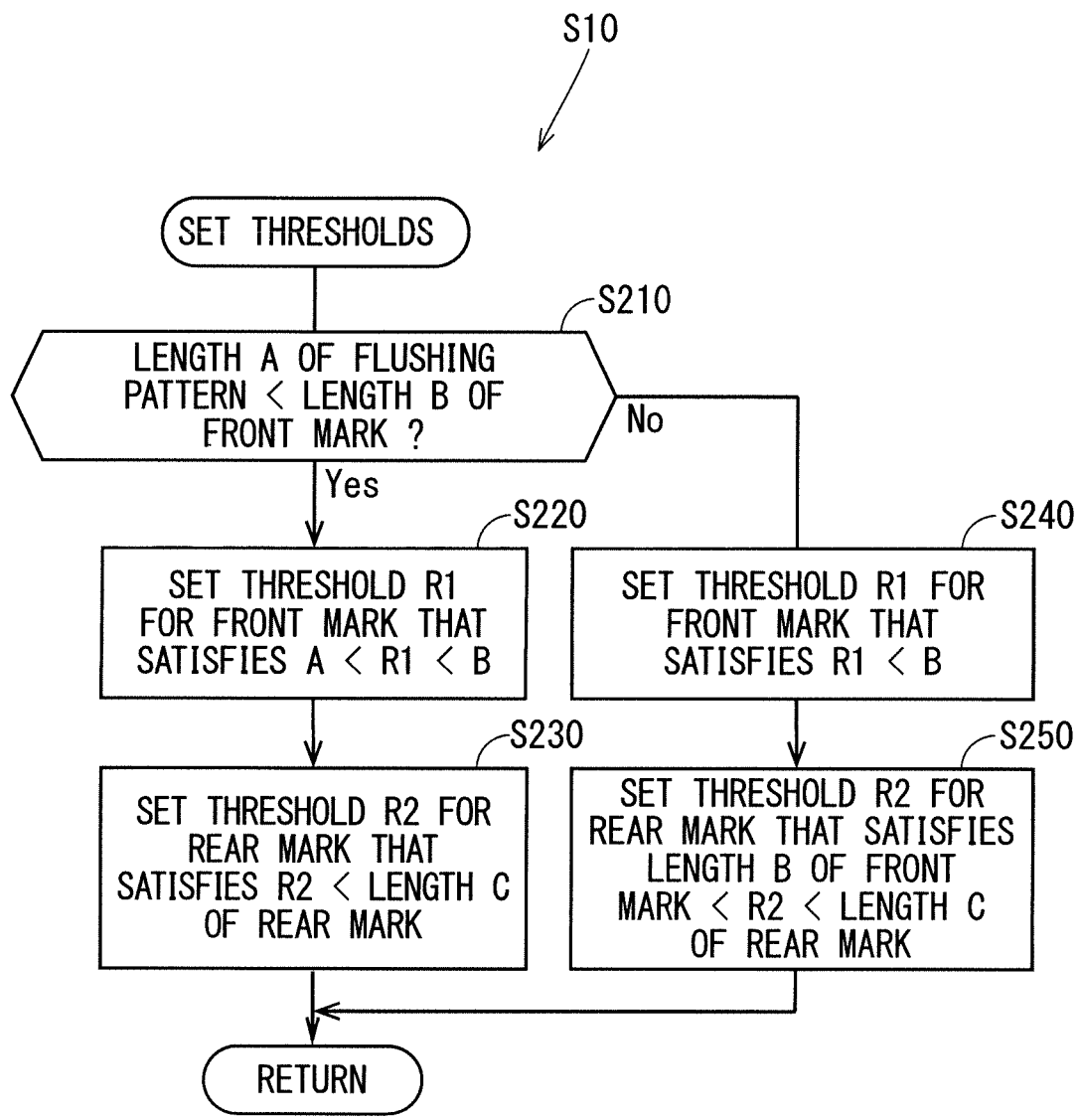
FIG. 13 is a flowchart illustrating an example of operations of the printing apparatus according to the embodiment.
Figure 14:
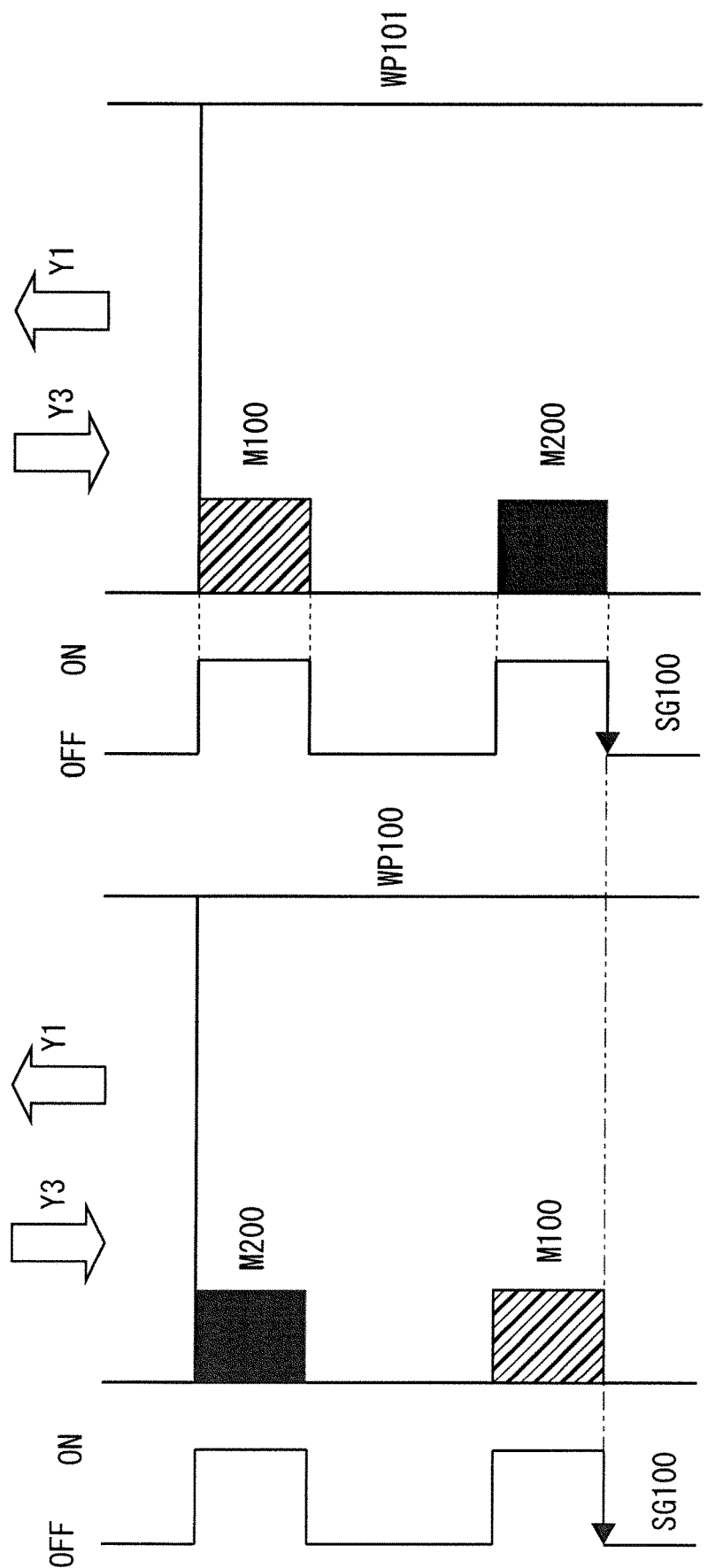
FIG. 14 illustrates operations of a printing apparatus according to a comparative technology.

FIGS. 2A to 5 are schematic diagrams illustrating operations of the printing apparatus 100. FIGS. 6 to 10 are schematic diagrams illustrating, for example, setting of thresholds R1 and R2 by the threshold setting unit 13 and processes performed by the second determining unit 12. Each of FIGS. 11 to 13 is a flowchart illustrating an example of operations of the printing apparatus 100.

The operations of the printing apparatus 100 will be hereinafter described based on the flowcharts in FIGS. 11 to 13 with appropriate reference to FIGS. 2A to 10.

Figure 11:
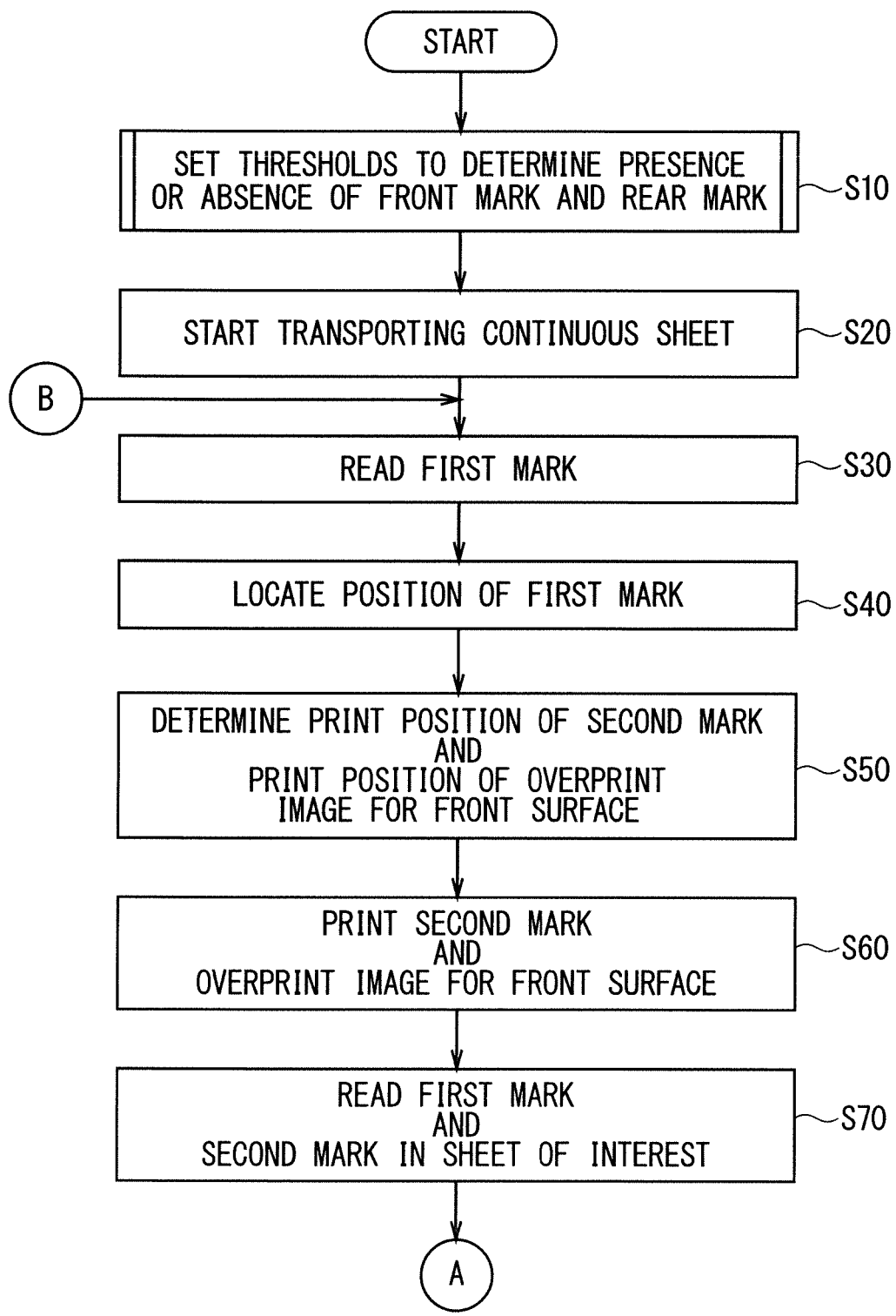
FIG. 11 is a flowchart illustrating an example of operations of the printing apparatus according to the embodiment.

In Step S10 of FIG. 11, the threshold setting unit 13 sets the thresholds R1 and R2 for the second determining unit 12 to determine the presence or absence of the front mark MF and the rear mark MR in each sheet of the continuous paper WP. The details of the process in Step S10 will be described later with reference to FIG. 13.

In Step S20, the transport mechanism 4 starts transporting the continuous paper WP.

In Step S30, the sensor 71 reads the first mark M1 attached to each sheet of the continuous paper WP. Specifically, the sensor 71 outputs the signal SG1 indicating the presence or absence of the first mark M1 facing the sensor 71 among the plurality of first marks M1, in the process of transporting the continuous paper WP by the transport mechanism 4.

In Step S40, the first determiner 11 locates the position of the first mark M1 in each sheet. Specifically, the first determining unit 11 locates the position of the first mark M1 in at least one target sheet among a plurality of sheets defined in the continuous paper WP, based on the signal SG1 output from the sensor 71.

In Step S50, the first determining unit 11 further determines, on the front surface 91 of the target sheet, a print position of the second mark M2 and a print position of a target image based on the located position of the first mark M1.

In Step S60, the print head 21 prints the second mark M2 and an overprint image for the front surface 91. Specifically, in the process of transporting the continuous paper WP by the transport mechanism 4, the print head 21 prints the second mark M2 at each print position of the second mark M2 and also prints the target image at each print position of the target image. The print positions are determined on the front surface 91 of the continuous paper WP by the first determining unit 11.

In Step S70, the sensor 72 reads the first mark M1 and the second mark M2 in a sheet of interest among a plurality of the sheets of the continuous paper WP. Specifically, the sensor 72 outputs the signal SG2 indicating the presence or absence of the first mark M1 facing the sensor 72 among a plurality of the first marks M1 and the presence or absence of the second mark M2 facing the sensor 72 among a plurality of the second marks M2 printed by the print head 21, in the process of transporting the continuous paper WP by the transport mechanism 4.

In Step S80 of FIG. 12, the second determining unit 12 determines whether the first mark M1 and the second mark M2 are printed on the front surface 91 of the sheet of interest.

Specifically, the second determining unit 12 makes, in each of the sheets, the following determination based on waveform signals representing signal values of the signal SG2 output from the sensor 72 which correspond to positions of the sheet along the transport path 201. In other words, the second determining unit 12 determines a continued length B (see FIGS. 6 to 9) of a signal value corresponding to the front mark MF along the transport path 201, in a predetermined order of the first mark M1 and the second mark M2. The second determining unit 12 determines that both of the first mark M1 and the second mark M2 are printed on the sheet, when the length B is greater than the threshold (a first threshold) R1 and a continued length C of a signal value corresponding to the rear mark MR in the aforementioned order along the transport path 201 is greater than the threshold (a second threshold) R2. The threshold R1 is smaller than the length B of the front mark MF in the transport path 201, and the threshold R2 is smaller than the length C of the rear mark MR in the transport path 201.

If the first mark M1 and the second mark M2 are printed on the front surface 91 of the sheet of interest as a result of the determination in Step S80, the second determining unit 12 locates a position of a predetermined one of the first mark M1 and the second mark M2 in Step S90. Information on the predetermined mark is prestored in the magnetic disk 161, and referred to by the second determining unit 12. Specifically, when the printing apparatus 100 prints in the first printing method, the second determining unit 12 locates the first mark M1 as a position of the predetermined mark. When the printing apparatus 100 prints in the second printing method, the second determining unit 12 locates the second mark M2 as the position of the predetermined mark.

In Step S100, the second determining unit 12 determines, on the back surface 92 of the sheet, a print position of a target image based on the located position of one of the marks.

In Step S110, the second print head 22 prints the target image at the print position determined on the back surface 92 by the second determining unit 12, that is, prints an image for the back surface 92. Specifically, in the process of transporting the continuous paper WP by the transport mechanism 4, the print head 22 prints the target image at each print position determined on the back surface 92 of the continuous paper WP by the second determining unit 12.

If the first mark M1 and the second mark M2 are not printed on the front surface 91 of the sheet of interest as a result of the determination in Step S80, the second determining unit 12 does not determine a position of an image for the back surface 92. In other words, the second determining unit 12 determines not to print any image on the back surface 92 of the sheet. Then, the processes move to Step S120, and whether to end the job is determined. When it is determined in Step S120 that the job is not ended, the processes return to Step S30, and the sensor 71 reads the first mark M1 in the next sheet. When it is determined in Step S120 that the job has been ended, the processes move to Step S130. Then, the transport mechanism 4 finishes transporting the continuous paper WP.

FIGS. 2A to 5 illustrate change in the continuous paper WP in the processes of printing the front surface overprint image G2 on the front surface 91 and the back surface print image G3 on the back surface 92 by the printing apparatus 100 when the first mark M1 and the pre-print image G1 are pre-printed on each sheet of the continuous paper WP.

Figure 3:
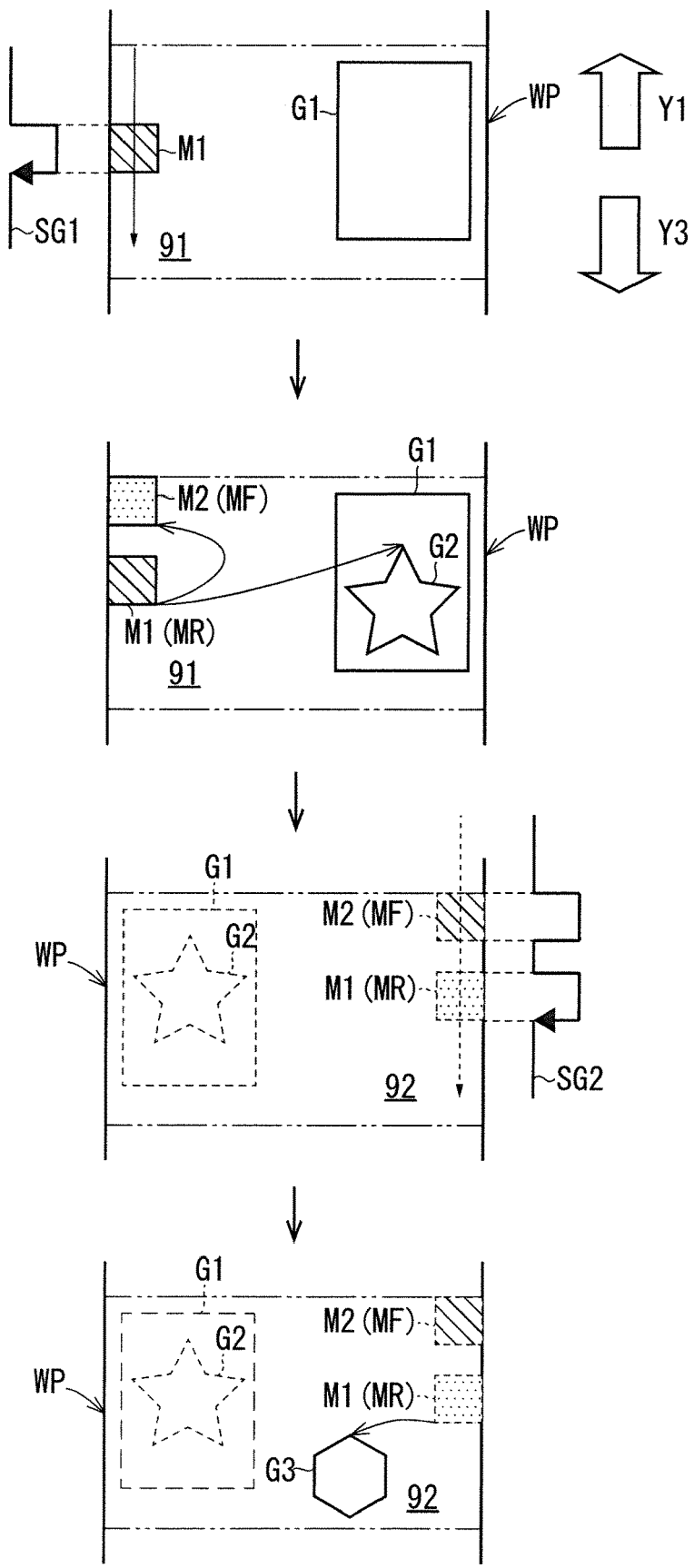
FIG. 3 is a schematic diagram illustrating operations of the printing apparatus in FIG. 1.

In FIGS. 2A to 2D and 4, the first mark M1 is the front mark MF, and the second mark M2 is the rear mark MR. In FIGS. 3 and 5, the first mark M1 is the rear mark MR, and the second mark M2 is the front mark MF.

In the process of Step S90, the second determining unit 12 locates a print position of the back surface print image G3 with respect to the first mark M1 out of the first mark M1 and the second mark M2 coexisting in the sheet in FIGS. 2A to 2D and 3, irrespective of the position relationship between the first mark M1 and the second mark M2. Here, the position accuracy of the front surface overprint image G2 and the back surface print image G3 with respect to the first mark M1 is maintained. Furthermore, the position accuracy of the first mark M1 and the pre-print image G1 is also maintained high in advance. Thus, the position of the front surface overprint image G2 with respect to the pre-print image G1 and the position of the back surface print image G3 with respect to the pre-print image G1 are maintained with high accuracy.

Figure 4:
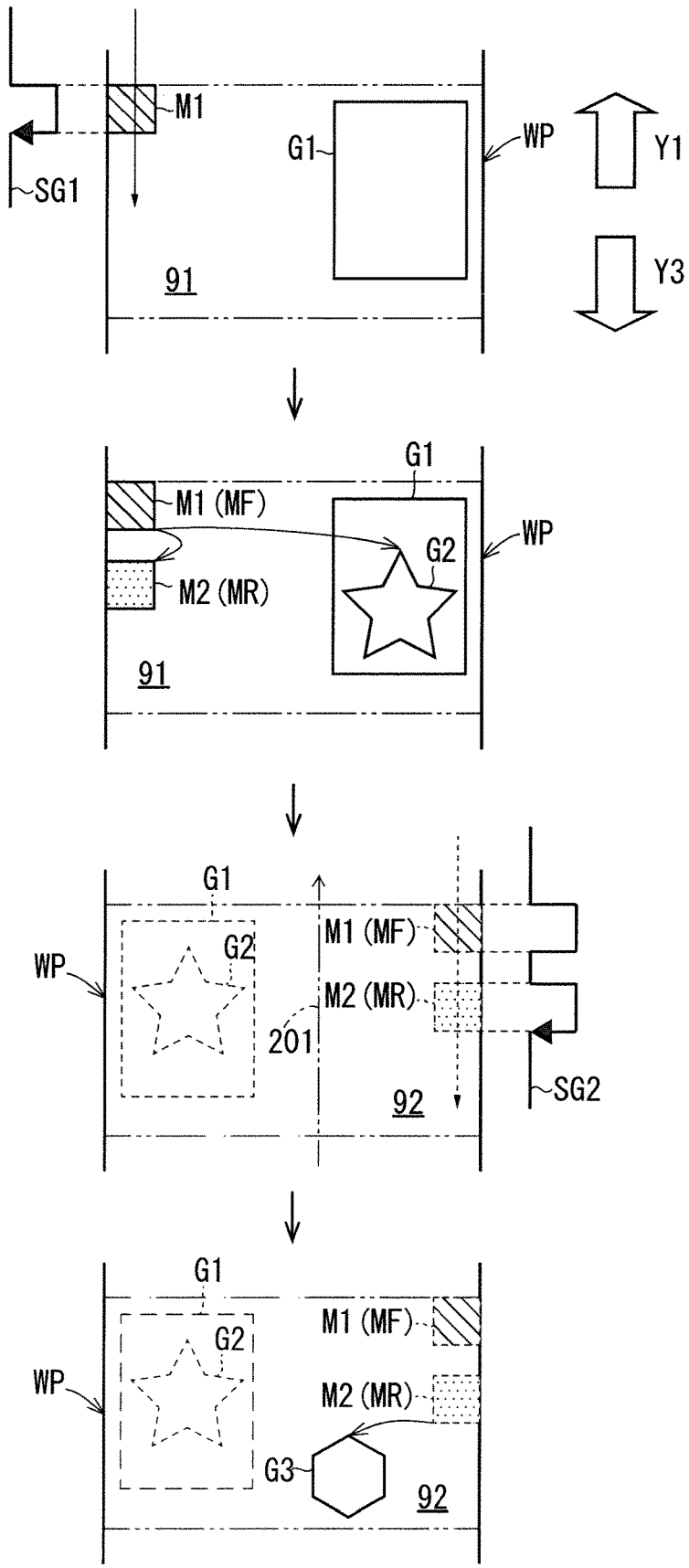
FIG. 4 is a schematic diagram illustrating operations of the printing apparatus in FIG. 1.
Figure 5:
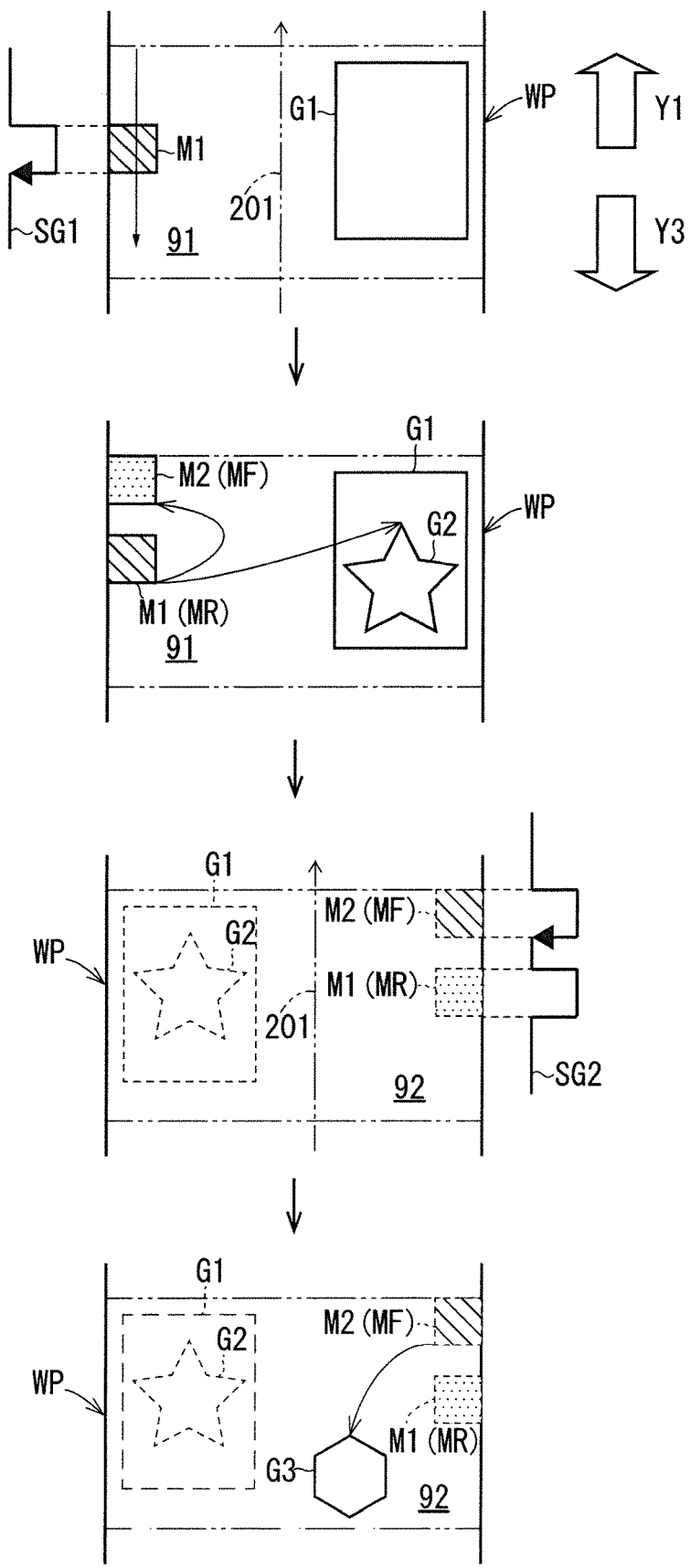
FIG. 5 is a schematic diagram illustrating operations of the printing apparatus in FIG. 1.
Figure 6:
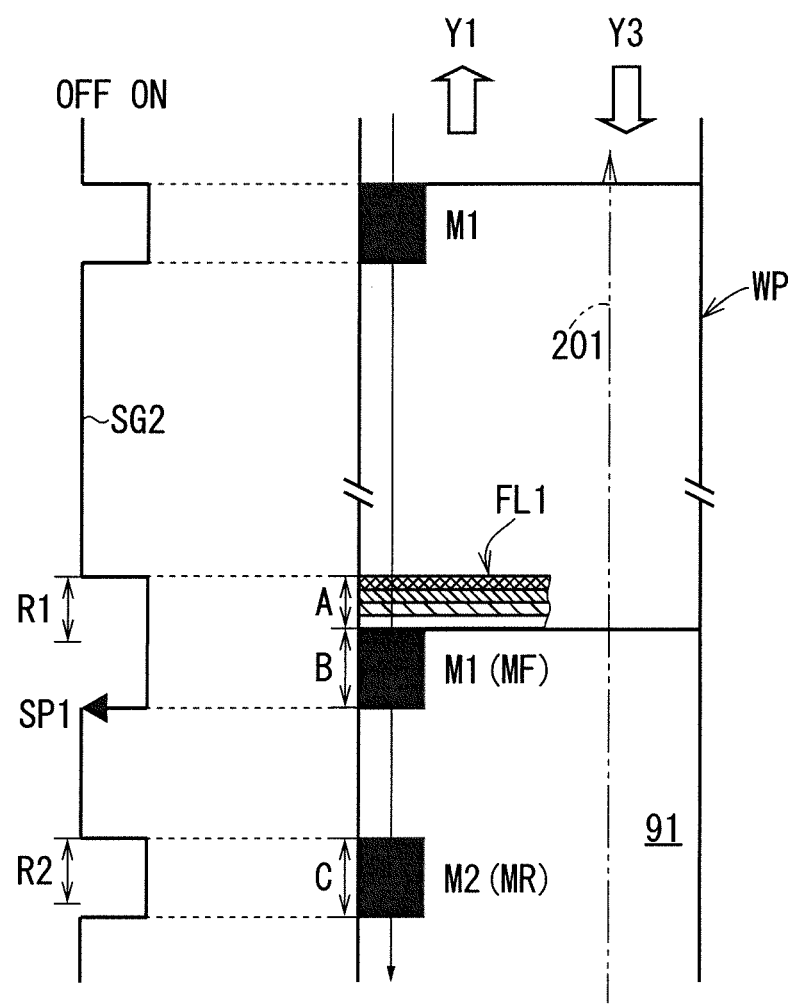
FIG. 6 is a schematic diagram illustrating, for example, setting of thresholds by a threshold setting unit.
Figure 7:
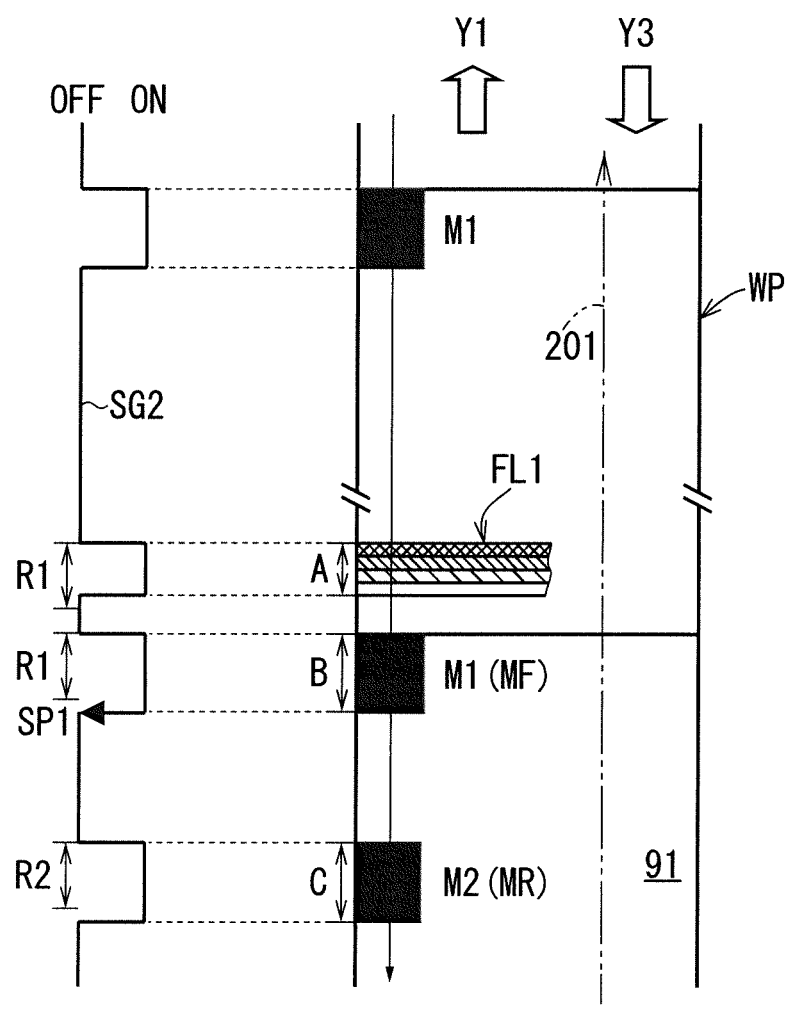
FIG. 7 is a schematic diagram illustrating, for example, setting of thresholds by the threshold setting unit.
Figure 8:
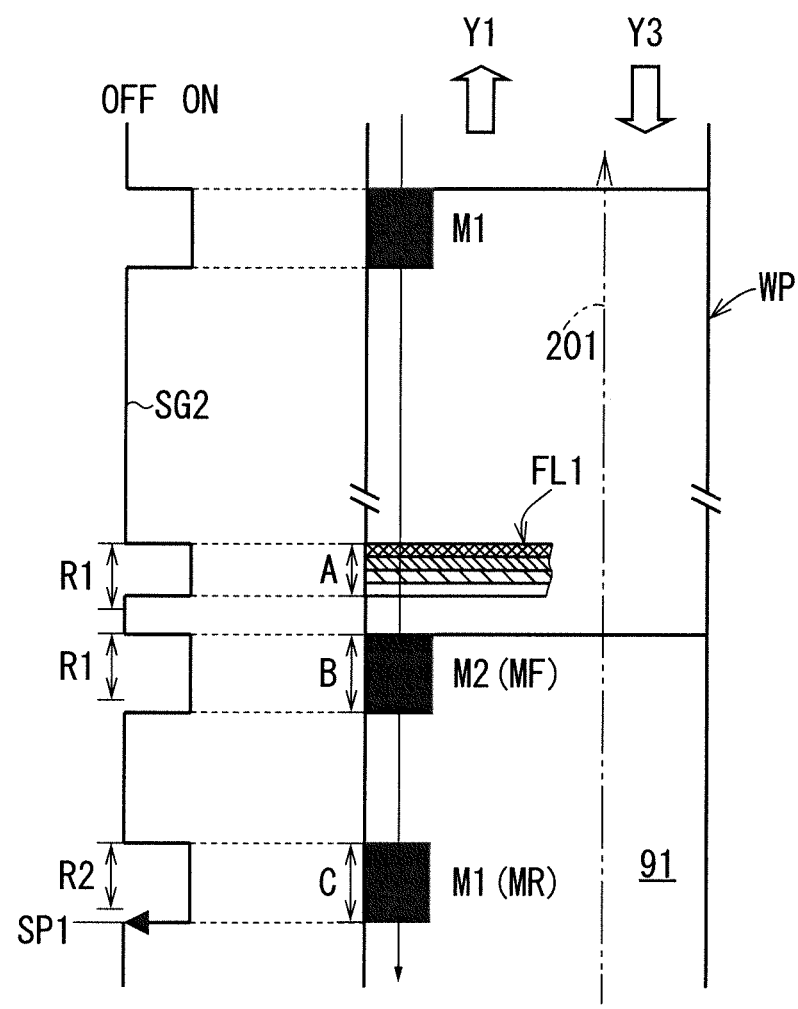
FIG. 8 is a schematic diagram illustrating, for example, setting of thresholds by the threshold setting unit.

In FIGS. 4 and 5, the second determining unit 12 locates a print position of the back surface print image G3 with respect to the second mark M2 out of the first mark M1 and the second mark M2 coexisting in the sheet. Here, the position relationship between the front surface overprint image G2 with respect to the second mark M2 and the back surface print image G3 with respect to the second mark M2 are maintained with high accuracy. Thus, the position relationship between the front surface overprint image G2 and the back surface print image G3 can be maintained with high accuracy.

Next, one example setting of the thresholds R1 and R2 by the threshold setting unit 13 will be described with reference to FIG. 13. An example case where the front mark MF is the first mark M1 and the rear mark MR is the second mark M2 (the cases in FIGS. 2A to 2D and 4) will be hereinafter described.

In Step S210 of FIG. 13, the threshold setting unit 13 determines whether the length A of the flushing pattern FL1 in the transport path 201 is smaller than the length B of the front mark MF in the transport path 201. Information based on which the determination is made is stored in the magnetic disk 161. Specifically, the threshold setting unit 13 determines the length A from the mark image data K1 prestored in the magnetic disk 161, and determines the length B, based on size information on the first mark M1 stored by the operator in the magnetic disk 161 before the job is started. The threshold setting unit 13 makes the determination in Step S210 with reference to the information.

If the length A is smaller than the length B as a result of the determination in Step S210, the threshold setting unit 13 sets the threshold R1 larger than the length A and smaller than the length B in Step S220.

In Step S230, the threshold setting unit 13 sets the threshold R2 smaller than the length C of the rear mark MR in the transport path 201. Then, the processes return to Step S20 in FIG. 11. In this example, the length C of the rear mark MR is of the second mark M2. The threshold setting unit 13 determines the length C from the mark image data K1 prestored in the magnetic disk 161.

FIGS. 6 to 9 illustrate the cases where Steps S220 and S230 are executed.

In FIGS. 6 to 9, the print head 21 ejects printing liquid toward the trailing end of the front surface 91 of a non-target sheet on which a target image is not printed among a plurality of sheets to perform flushing, so that the linear flushing pattern FL1 that extends in the width direction of the continuous paper WP is printed at the trailing end of the front surface 91 of the non-target sheet. This non-target sheet is joined to the target sheet on which the print head 21 prints the target image, ahead of the target sheet in the transport path 201. Then, the print head 21 prints the flushing pattern FL1, the front mark MF, and the rear mark MR so that the flushing pattern FL1 is shorter than the front mark MF in the transport path 201.

Thus, in the examples of FIGS. 6 to 9, the threshold setting unit 13 sets the threshold R1 larger than the length A of the flushing pattern FL1 and smaller than the length B of the front mark MF in the transport path 201.

Figure 9:
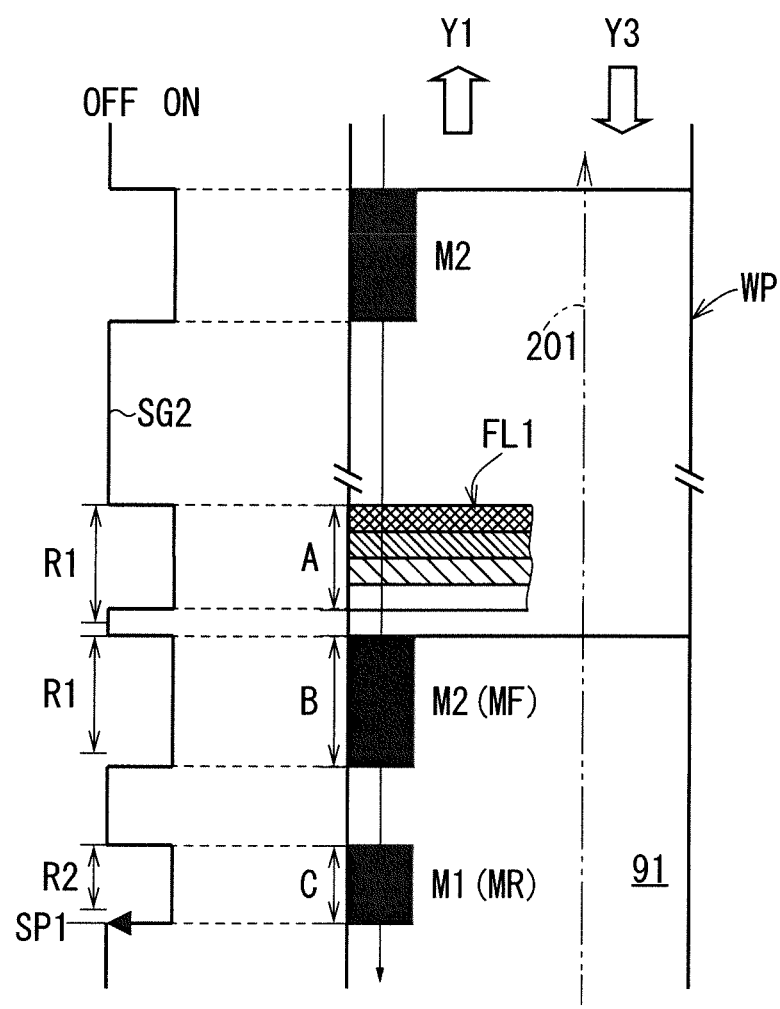
FIG. 9 is a schematic diagram illustrating, for example, setting of thresholds by the threshold setting unit.

In any of these cases, the second determining unit 12 can determine that the front mark MF and the rear mark MR exist in one sheet. As illustrated in FIG. 9, the second determining unit 12 can determine that the front mark MF and the rear mark MR exist in one sheet even when the front mark MF is longer than the rear mark MR.

If the length A is larger than or equal to the length B as a result of the determination in Step S210, the threshold setting unit 13 determines the threshold R1 to be smaller than the length B in Step S240.

In Step S250, the threshold setting unit 13 sets the threshold R2 larger than the length B of the front mark MF and smaller than the length C of the rear mark MR. Then, the processes return to Step S20 in FIG. 11.

Figure 10:
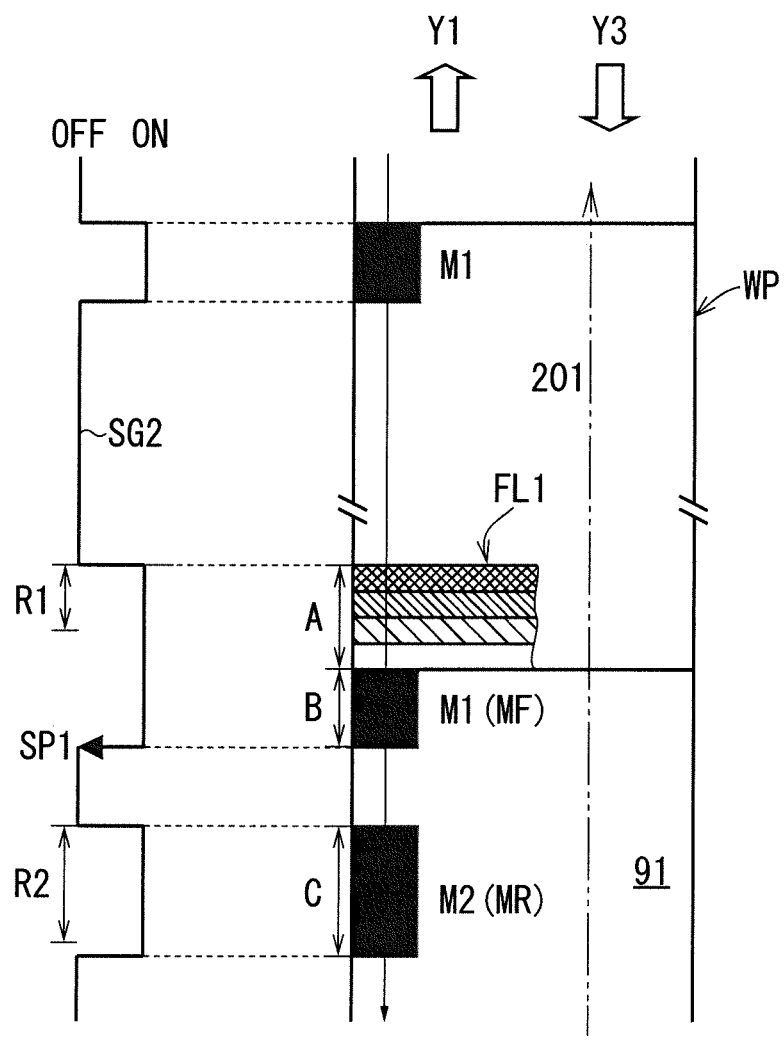
FIG. 10 is a schematic diagram illustrating, for example, setting of thresholds by the threshold setting unit.

For example, the print head 21 prints the flushing pattern FL1, the front mark MF, and the rear mark MR so that the flushing pattern FL1 is longer than the front mark MF and the front mark MF is shorter than the rear mark MR in the transport path 201, and the flushing pattern FL1 is joined to the front mark MF in FIG. 10.

As a result of the determination in Step S210, the processes of Steps S240 and S250 are executed in FIG. 10.

The threshold setting unit 13 sets the threshold R1 smaller than the length of the front mark MF in the transport path 201, and sets the threshold R2 larger than the length of the front mark MF and smaller than the length of the rear mark MR in the transport path 201.

Thus, even when the flushing pattern FL1 is longer than the front mark MF and the front mark MF is shorter than the rear mark MR as illustrated in FIG. 10, the second determining unit 12 can determine that the front mark MF and the rear mark MR exist in one sheet.

The second determining unit 12 may use parameters other than the lengths, for example, an elapsed time uniquely determined from the lengths, instead of the lengths.

Although the example cases where the front mark MF is the first mark M1 and the rear mark MR is the second mark M2 (the cases in FIGS. 2A to 2D and 4) are described, the embodiment is applicable to a case where the front mark MF is the second mark M2 and the rear mark MR is the first mark M1 (the cases in FIGS. 3 and 5).

The printing apparatus according to the embodiment with the aforementioned configuration prints a target image at a print position determined on the front surface 91 of the continuous paper WP based on the position of the first mark M1, and prints the target image at a print position determined on the back surface 92 based on a predetermined one of the first mark M1 and the second mark M2. Since the printing apparatus can print the target image on the back surface 92 with respect to the position of the same one of the first mark M1 and the second mark M2, irrespective of the position of the first mark M1, variations in the accuracy of printing on the back surface 92 (back surface) with respect to the front surface 91 (front surface) can be reduced.

The printing apparatus according to the embodiment prints the target image at the print position determined on the back surface 92 of each sheet on which both of the first mark M1 and the second mark M2 are printed, among a plurality of sheets defined in the continuous paper WP. Thus, even when printing on the front surface 91 of only a part of the plurality of sheets defined in the continuous paper WP, the printing apparatus can extract the target sheets, and print an image on the back surface 92.

The printing apparatus according to the embodiment can easily determine whether both of the first mark M1 and the second mark M2 are printed on a sheet, using the thresholds R1 and R2.

The printing apparatus according to the embodiment can detect the front mark MF and the rear mark MR printed on one sheet, when the print head 21 prints the flushing pattern FL1 and the flushing pattern FL1 is shorter than the front mark MF out of the first mark M1 and the second mark M2 in the transport path 201.

The printing apparatus according to the embodiment can detect the front mark MF and the rear mark MR printed on one sheet, when the print head 21 prints the flushing pattern FL1 longer than the front mark MF and the flushing pattern FL1 is joined to the front mark MF.

In the printing method according to the embodiment, a target image is printed at a print position determined on the front surface 91 of the continuous paper WP based on the position of the first mark M1, and the target image is printed at a print position determined on the back surface 92 based on the position of a predetermined one of the first mark M1 and the second mark M2. Since the target image can be printed in this printing method on the back surface 92 with respect to the position of the same one of the first mark M1 and the second mark M2, irrespective of the position of the first mark M1, variations in the accuracy of printing on the back surface 92 (back surface) with respect to the front surface 91 (front surface) can be reduced.

In the printing method according to the embodiment, the target image is printed at the print position determined on the back surface 92 of each sheet on which both of the first mark M1 and the second mark M2 are printed, among a plurality of sheets defined in the continuous paper WP. Thus, even when printing on the front surface 91 of only a part of the plurality of sheets defined in the continuous paper WP in the printing method, the printing apparatus can extract the target sheets, and print an image on the back surface 92.

Although the printing apparatus 100 according to the embodiment is inkjet-based, the present disclosure is applicable to printing apparatus based on the other printing methods (e.g., electrophotography).

Furthermore, the printing apparatus 100 according to the embodiment is configured to print on long lengths of a print medium (the continuous paper WP), and cut the print medium into a plurality of sheets of a fixed length after the printing. However, the present disclosure is applicable to a sheet-fed printing apparatus that prints one by one on a plurality of sheets precut into a fixed length.

Although the same sensor (the second sensor 72) in the printing apparatus 100 according to the embodiment detects the first mark M1 and the second mark M2, the present disclosure is also applicable to a case where separate sensors detect these marks.

Although the present disclosure is described in detail, the description is illustrative and not restrictive in all aspects. Within the scope of the present disclosure, the embodiment can be appropriately modified or omitted.

EXPLANATION OF REFERENCE SIGNS 100 printing apparatus
1 paper feeder
4 transport mechanism
5 paper ejector
6 front surface printing unit
7 inversion unit
8 back surface printing unit
130 controller
WP continuous paper (print medium)
91 front surface (first surface)
92 back surface (second surface)
201 transport path
M1 first mark
M2 second mark
MF front mark
MR rear mark
SG1, SG2 signal
71 sensor (first sensor)
72 sensor (second sensor)
21 print head (first print head)
22 print head (second print head)

The invention claimed is:

1. A printing apparatus, comprising:
a transport mechanism that transports, along a transport path, sheets of a print medium with a first surface on which a first mark is pre-printed;
a first sensor disposed to face the transport path, the first sensor outputting a signal indicating the presence or absence of the first mark facing the first sensor, in a process of transporting the print medium by the transport mechanism;
a first determining unit that locates a position of the first mark based on the signal output from the first sensor, and determines, on the first surface, a print position of a second mark and a print position of a first target image based on the located position of the first mark;
a first print head disposed more downstream of the transport path than the first sensor to face the first surface, the first print head printing the second mark at the print position of the second mark and the first target image at the print position of the first target image, the print positions being determined on the first surface by the first determining unit;

a second sensor disposed more downstream of the transport path than the first print head to face the first surface, the second sensor outputting a signal indicating the presence or absence of the first mark facing the second sensor and the presence or absence of the second mark facing the second sensor, in the process of transporting the print medium by the transport mechanism;

a second determining unit that locates a position of a predetermined one of the first mark and the second mark, based on the signal output from the second sensor, and determines, on a second surface of the print medium, a print position of a second target image based on the located position of the predetermined one of the first mark and the second mark; and a second print head disposed more downstream of the transport path than the second sensor to face the second surface, the second print head printing the second target image at the print position of the second target image, the print position being determined on the second surface by the second determining unit.

2. The printing apparatus according to claim 1,
wherein a pre-print image is pre-printed on the first surface, and
the first mark is the predetermined one of the first mark and the second mark.

3. The printing apparatus according to claim 1,
wherein the second mark is the predetermined one of the first mark and the second mark.

4. The printing apparatus according to claim 1,
wherein a pre-print image is pre-printed on the first surface,
the printing apparatus further comprises a designating unit that designates one of the first mark and the second mark as the predetermined mark, and
the second determining unit determines, on the second surface of the print medium, the print position of the second target image based on a position of the mark designated by the designating unit.

5. The printing apparatus according to claim 1,
wherein the print medium is long lengths of a continuous sheet, and a plurality of the first marks are pre-printed on the first surface along a longitudinal direction of the print medium,
the printing apparatus prints sheet by sheet on at least one predetermined target sheet among a plurality of sheets predefined in the print medium to correspond to the plurality of the first marks,
the first sensor outputs the signal indicating the presence or absence of the first mark facing the first sensor among the plurality of the first marks, in the process of transporting the print medium by the transport mechanism,
the first determining unit locates a position of the first mark in each of the at least one predetermined target sheet, based on the signal output from the first sensor, and determines, on the first surface of the target sheet, the print position of the second mark and the print position of the first target image based on the located position of the first mark,
the first print head prints the second mark at each of the print positions of the second mark and the first target image at each of the print positions of the first target image, the print positions being determined on the first surface of the print medium by the first determining unit,
the second sensor outputs a signal indicating the presence or absence of the first mark facing the second sensor among the plurality of the first marks and the presence or absence of the second mark facing the second sensor among the second marks printed by the first print head, in the process of transporting the print medium by the transport mechanism,
the second determining unit determines, in each of the plurality of sheets based on the signal output from the second sensor, whether both of the first mark and the second mark are printed on the sheet, locates the position of the predetermined one of the first mark and the second mark when both of the first mark and the second mark are printed on the sheet, and determines, on the second surface of the sheet, the print position of the second target image based on the located position of the predetermined one of the first mark and the second mark, and
the second print head prints the second target image at each of the print positions of the second target image, the print positions being determined on the second surface of the print medium by the second determining unit.

6. The printing apparatus according to claim 5,
wherein the first determining unit determines the print position of the second mark in each of the at least one predetermined target sheet so that the first mark and the second mark are aligned in a predetermined order along the transport path,
the second determining unit determines, in each of the plurality of sheets based on waveform signals representing signal values of signals output from the second sensor which correspond to positions of the sheet along the transport path, that both of the first mark and the second mark are printed on the sheet, when a continued length of a signal value corresponding to a front mark aligned in the order is greater than a first threshold and a continued length of a signal value corresponding to a rear mark aligned in the order is greater than a second threshold, and
the first threshold is smaller than the length of the front mark in the transport path, and the second threshold is smaller than the length of the rear mark in the transport path.

7. The printing apparatus according to claim 6,
wherein the first print head ejects printing liquid toward a trailing end of the first surface of a non-target sheet on which a target image is not printed among the plurality of sheets to perform flushing, so that a linear flushing pattern that extends in a width direction of the print medium is printed at the trailing end of the first surface of the non-target sheet,
the non-target sheet is joined to the target sheet on which the first print head prints the target image, ahead of the target sheet in the transport path, and
the first print head prints the flushing pattern, the front mark, and the rear mark in the transport path so that the flushing pattern is shorter than the front mark,
the printing apparatus further comprising a threshold setting unit that sets the first threshold larger than a length of the flushing pattern in the transport path and smaller than the length of the front mark in the transport path.

8. The printing apparatus according to claim 6,
wherein the first print head ejects printing liquid toward a trailing end of the first surface of a non-target sheet on which a target image is not printed among the plurality of sheets to perform flushing, so that a linear flushing pattern that extends in a width direction of the print medium is printed at the trailing end of the first surface of the non-target sheet, the non-target sheet is joined to the target sheet on which the first print head prints the target image, ahead of the target sheet in the transport path, and the first print head prints the flushing pattern, the front mark, and the rear mark in the transport path so that the flushing pattern is longer than the front mark, the front mark is shorter than the rear mark, and the flushing pattern is joined to the front mark, the printing apparatus further comprising a threshold setting unit that sets the first threshold smaller than the length of the front mark in the transport path, and sets the second threshold larger than the length of the front mark and smaller than the length of the rear mark in the transport path.

9. A method for printing on sheets of a print medium with a first surface on which a first mark is pre-printed, the method comprising:

a first determining step of determining, on the first surface, a print position of a second mark and a print position of a first target image based on a position of the first mark;

a first printing step of printing the second mark at the print position of the second mark and the first target image at the print position of the first target image, the print positions being determined on the first surface in the first determining step;

a second determining step of determining, on a second surface of the print medium, a print position of a second target image based on a position of a predetermined one of the first mark and the second mark; and a second printing step of printing the second target image at the print position of the second target image, the print position being determined on the second surface in the second determining step.

10. The method according to claim 9,
wherein the print medium is long lengths of a continuous sheet, and a plurality of the first marks are pre-printed on the first surface along a longitudinal direction of the print medium, the printing method is a method for printing sheet by sheet on at least one predetermined target sheet among a plurality of sheets predefined in the print medium to correspond to a plurality of the first marks, the first determining step is a step of determining, on the first surface of each of the at least one predetermined target sheet, the print position of the second mark and the print position of the first target image based on the position of the first mark in the target sheet, the first printing step is a step of printing the second mark at each of the print positions of the second mark and the first target image at each of the print positions of the first target image, the print positions being determined on the first surface of the print medium in the first determining step, the second determining step is a step of determining whether both of the first mark and the second mark are printed on each of the plurality of sheets, and determining, on the second surface of the sheet, the print position of the second target image based on the position of the predetermined one of the first mark and the second mark when both of the first mark and the second mark are printed on the sheet, and the second printing step is a step of printing the second target image at each of the print positions of the second target image, the print positions being determined on the second surface of the print medium in the second determining step.

\* \* \* \* \*